United States Patent Office 3,228,256
Patented Jan. 11, 1966

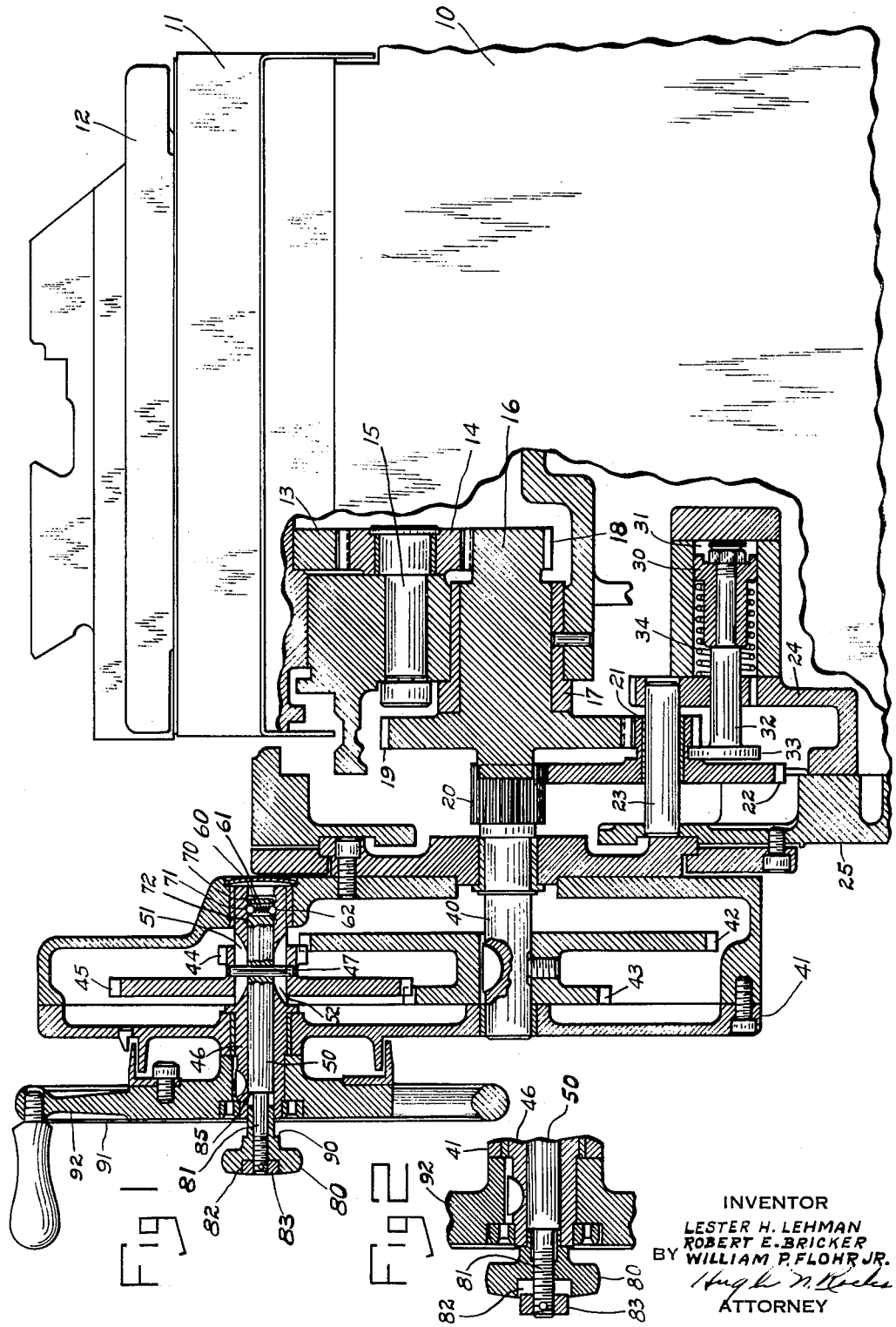

3,228,256
HAND TRAVERSE SAFETY DEVICE
Lester H. Lehman, Hagerstown, Md., and Robert E. Bricker and William P. Flohr, Jr., Waynesboro, Pa., assignors to Landis Tool Company, Waynesboro, Pa.
Filed Jan. 25, 1962, Ser. No. 168,610
7 Claims. (Cl. 74—342)

This invention relates to machine tools, particularly grinding machine, and more particularly, manual mechanisms for traversing the work carriage of the grinding machine.

Many workpieces have an annular flange or shoulder portion which must be held within close limits of tolerance. The axial position of the workpiece during grinding is dependent on accurately positioning and holding the work carriage. The carriage is usually positioned by means of a hand traverse mechanism which includes speed change gearing for fast and slow feeds. Regardless of whether the gearing is positioned for fast or slow speeds, there is always danger of the hand wheel being shifted accidentally and changing the endwise position of the work carriage. Accidental change of carriage position might result in damage to the wheel or work, or both.

In previous hand traverse mechanisms of this type, the spacing of the gears has been such that one set of gears is completely disengaged before engagement of the other set begins. In this invention, the axial spacing of the speed change gears and the gears with which they co-act is such that when one is completely meshed with its co-acting gear, the other is just out of engagement with its co-acting gear. By stopping the shifting movement of the speed change gears at mid-point, both gears may be in partial engagement with their co-acting gears, and the mechanism is thus locked against accidental or unintentional movements.

It is, therefore, an object of the present invention to provide means for locking the hand traverse mechanism with the work carriage in any predetermined axial position.

Another object is to provide means for positioning the speed change element of a hand traverse mechanism so that both fast and slow speed change gears are in partial engagement with their co-acting gears.

Another object is to provide means whereby the intermediate or locking position of the gears is one limit of movement of the shifting means.

FIG. 1 is a partial end view of a grinding machine with the manual traverse mechanism shown in section.

FIG. 2 is a partial sectional elevation showing the actuating knob 80 in a position opposite to that shown in FIG. 1.

Bed 10 has a carriage 11 slidably mounted thereon. Work table 12 is mounted for angular adjustment on carriage 11.

The means for effecting traverse movement of carriage 11 consists of a rack 13 attached to the underside of carriage 11. Pinion 14 rotatably mounted on shaft 15 in bed 10 is in operative engagement with rack 13. Cluster gear 16 is rotatably mounted in sleeve 17 in bed 10 and has a pinion 18 engaging pinion 14. At the other end of cluster gear 16 is a gear 19. Gear 19 engages pinion 21 integral with gear 22 in slidable engagement with pinion 20. Pinion 21 and gear 22 are slidably mounted on shaft 23, one end of which is supported in bracket 24. Bracket 24 is attached to bracket 25 which, in turn, is attached to bed 10. The other end of shaft 23 is supported in bracket 25.

The means for shifting pinion 21 and gear 22 on shaft 23 consists of piston 30 in cylinder 31 attached to bracket 24. Piston rod 32 passes through bracket 24 and has a flange portion 33 connected to pinion 21 and gear 22.

Piston 30 and associated parts are held in right hand position by means of spring 34. When fluid under pressure is directed to the right hand end of cylinder 31, piston 30 shifts pinion 21 to the left out of engagement with gear 19, thus disconnecting the manual traverse mechanism from carriage 11.

The means for rotating pinion 20 for traversing carriage 11, consists of a shaft 40 rotatably mounted in housing 41 and keyed to gear 42 and pinion 43. Pinion 20 is mounted or formed on shaft 40. Gear 42 and pinion 43 alternately engage pinion 44 and gear 45 respectively. Pinion 44 and gear 45 are attached to hand wheel shaft 46 by means of pin 47. Pin 47 passes through shaft 50 which is slidably mounted in shaft 46. Movement of shaft 50 in shaft 46 is permitted by slots 51 and 52 in shaft 46 where pin 47 passes through shaft 46 to shift pinion 44 and gear 45.

Gear 42 and pinion 43 on shaft 40 are axially spaced by an amount greater than the spacing of pinion 44 and gear 45 on hand wheel shaft 46. This spacing is such that gear 42 can be partially engaged with pinion 44 at the same time that pinion 43 is similarly engaged with gear 45. With the gears in this intermediate position, the mechanism is locked against movement in either direction.

The right hand end of shaft 50 contains a transverse bore 60 in which spring 61 presses balls 62 against the inner surface of shaft 46. Longitudinally spaced grooves 70, 71 and 72 on the inside surface of shaft 46, when engaged by balls 62, serve to locate shaft 50 and pinion 44 and gear 45 in low speed position, intermediate locked position, and high speed position respectively.

Knob 80 is threaded to reduced portion 81 of shaft 50. Recess 82 is provided in knob 80 to accommodate collar 83 pinned to reduced portion 81. Shoulder 85 formed on shaft 50 at the end of reduced portion 81, serves as a stop for inward adjustment of knob 80. Collar 83 is the limit of outward adjustment of knob 80. Thus, knob 80 in the position shown relative to shaft 50 and collar 83 may be shifted to the right until balls 62 engage groove 70 and pinion 44 engages gear 42 for a slow speed hand traverse. Shifting knob 80 to the left until balls 62 engage groove 72 locates gear 45 in engagement with gear 43 for high speed operation of the hand traverse.

With shaft 50 in left hand position, adjusting knob 80 to the right until it engages shoulder 85 positions said knob 80 so that when said knob and shaft 50 are shifted to the right, shoulder 90 on knob 80 will be stopped by engagement with face 91 of hand wheel 92, balls 62 will be in groove 71 and pinion 44 and gear 45 each in partial engagement with gear 42 and pinion 43 respectively to prevent movement of carriage 11 by hand wheel 92.

We claim:

1. In a machine tool, a movable member, a mechanism for traversing said movable member including a hand wheel, a hand wheel shaft, a pair of axially spaced gears of different diameters slidably mounted on said shaft, a second shaft parallel to said first mentioned shaft, a pair of axially spaced gears on said second shaft, means connecting said second shaft with said movable member, said gears being of such diameters as to co-act with said first mentioned gears and adapted for alternate engagement with said first mentioned gears, the spacing between the gears of each pair is such that in an intermediate position, both pairs of gears are in partial engagement, means for effecting said alternate engagement comprising a speed change shaft slidably mounted in said hand wheel shaft, and means connecting said speed change shaft to said gears on said hand wheel shaft to shift said first pair of gears axially relative to said pair of gears on said second shaft.

2. In a machine tool, a movable member, a mechanism for traversing said movable member including a hand wheel, a speed change member consisting of a pair of axially spaced driving gears of different diameters, a pair of axially spaced driven gears of different diameters for co-acting alternately with said driving gears, means connecting said driven gears with said movable member, means for simultaneously partially engaging each of said driving gears with its co-acting driven gears comprising a shift member for shifting one of said pairs of gears axially relative to the other, and a knob axially adjustable on said shift member and having a locating surface for positively engaging a fixed co-acting surface in one position of adjustment to prevent shifting said driving gears beyond said partially engaged relation.

3. In a machine tool, a movable member, a mechanism for traversing said movable member including a hand wheel, gearing connecting said hand wheel with said movable member including a speed change member consisting of a shaft, a pair of axially spaced gears of different diameters slidably mounted on said shaft, another pair of axially spaced gears of different diameters for co-acting alternately with said first mentioned gears, the axial spacing of said gears being such that in intermediate axial position, each of said first pair of axially spaced gears is in simultaneous engagement with said other pair of axially spaced gears, a speed change shaft connected to said first mentioned gears, a knob threaded to one end of said speed change shaft and adjustable to two axially spaced positions on said first mentioned shaft, a fixed surface on said mechanism in opposed relation to said knob, said knob being effective in one position of adjustment on said speed change shaft to prevent movement of said speed change shaft and said first mentioned pair of gears beyond said intermediate position.

4. In a machine tool, a movable member, a mechanism for traversing said movable member including a hand wheel, a hand wheel shaft, a pair of axially spaced gears of different diameters slidably mounted on said hand wheel shaft, a second shaft parallel to said first mentioned shaft, a pair of axially spaced gears on said second shaft, means connecting said second pair of gears with said movable member, said gears being of such diameters as to co-act with said first mentioned gears and adapted for alternate engagement with said first mentioned gears, means for effecting said alternate engagement comprising a speed change shaft slidably mounted in said hand wheel shaft and connected to said gears on said hand wheel shaft, an axially adjustable knob on said speed change shaft to shift said first pair of gears axially relative to said second pair of gears, and means on said knob operable in one position of adjustment to locate both pairs of said gears in partial engagement whereby to lock said traversing mechanism against movement.

5. In a machine tool, a movable member, a mechanism for traversing said movable member including a hand wheel, a hand wheel shaft, a pair of axially spaced gears of different diameters slidably mounted on said shaft, a second shaft parallel to said first mentioned shaft, a pair of axially spaced gears on said second shaft, means connecting said second shaft with said movable member, said gears being of such diameters as to co-act with said first mentioned gears and adapted for alternate engagement with said first mentioned gears, means for effecting said alternate engagement comprising a speed change shaft slidably mounted in said hand wheel shaft, a knob on said speed change shaft to shift said first pair of gears axially relative to said second pair of gears, said knob being threaded to one end of said speed change shaft and adjustable to two positions on said shaft and having means operable in one of said positions to locate each of said first pair of gears in partial engagement with each of said second pair of gears.

6. In a machine tool, a movable member, a mechanism for traversing said movable member including a hand wheel, a hand wheel shaft, a pair of axially spaced gears of different diameters slidably mounted on said shaft, a second shaft parallel to said first mentioned shaft, a pair of axially spaced gears on said second shaft, means connecting said second shaft with said movable member, said gears being of such diameters as to co-act with said first mentioned gears and adapted for alternate engagement with said first mentioned gears, means for effecting said alternate engagement comprising a speed change shaft slidably mounted in said hand wheel shaft, a knob on said speed change shaft to shift said first pair of gears axially relative to said second pair of gears, said knob being threaded to one end of said speed change shaft for axial adjustment on said shaft, a shoulder on said speed change shaft for determining the inner limit of adjustment of said knob, a collar on said speed change shaft for determining the outer limit of adjustment of said knob, said first pair of gears being shiftable to three axial positions, the spacing of said gears on their respective shafts being such that in said intermediate position, each gear on said hand wheel shaft is in partial engagement with its co-acting gears on said second shaft, and said knob being operable when positioned against said shoulder and shifted inwardly, to locate said gears in said intermediate position.

7. In a machine tool, a movable member, a mechanism for traversing said movable member including a hand wheel, gearing connecting said hand wheel with said movable member including a speed change member consisting of a shaft, a pair of axially spaced gears of different diameters slidably mounted on said shaft, another pair of axially spaced gears of different diameters for co-acting alternately with said first mentioned gears the axial spacing of said gears being such that in intermediate axial position, each of said first pair of axially spaced gears is in simultaneous engagement with its co-acting gear in said other pair of axially spaced gears, a speed change shaft connected to said first mentioned gears, a knob threaded to one end of said speed change shaft and adjustable to two positions on said shaft, said knob being effective in one position of adjustment on said speed change shaft to shift said shaft between two end positions and said intermediate position, said knob having means operable in its other position of adjustment to limit the movement of said speed change shaft between one end position and said intermediate position.

References Cited by the Examiner

UNITED STATES PATENTS

| | | | |
|---|---|---|---|
| 1,452,509 | 4/1923 | Hewig | 74—27 X |
| 1,581,927 | 4/1926 | Kollock | 74—342 |
| 1,923,995 | 8/1933 | Nock | 74—355 |
| 1,924,608 | 8/1933 | Isler | 74—27 |
| 2,180,469 | 11/1939 | Jaeger et al. | 192—4 |
| 2,233,098 | 2/1941 | Hodnett | 74—27 |
| 2,262,448 | 11/1941 | Boyce et al. | 74—503 |
| 2,268,389 | 12/1941 | Garside | 74—27 X |
| 2,437,094 | 3/1948 | Hyland | 74—342 |
| 2,761,252 | 9/1956 | Fichera | 51—92 |
| 3,105,675 | 10/1963 | Blackburn | 74—342 X |

FOREIGN PATENTS 996,936  12/1951  France.

DON A. WAITE, *Primary Examiner.*

BROUGHTON G. DURHAM, MILTON KAUFMAN,
*Examiners.*